United States Patent
Kulkarni et al.

(10) Patent No.: US 9,098,891 B2
(45) Date of Patent: Aug. 4, 2015

(54) ADAPTIVE SAMPLING FOR SEMICONDUCTOR INSPECTION RECIPE CREATION, DEFECT REVIEW, AND METROLOGY

(71) Applicant: KLA-Tencor Corporation, Milpitas, CA (US)

(72) Inventors: Ashok V. Kulkarni, San Jose, CA (US); Saibal Banerjee, Fremont, CA (US)

(73) Assignee: KLA-Tencor Corp., Milpitas, CA (US)

( * ) Notice: Subject to any disclaimer, the term of this patent is extended or adjusted under 35 U.S.C. 154(b) by 0 days.

(21) Appl. No.: 14/228,023

(22) Filed: Mar. 27, 2014

(65) Prior Publication Data

US 2014/0301630 A1   Oct. 9, 2014

Related U.S. Application Data

(60) Provisional application No. 61/809,417, filed on Apr. 8, 2013.

(51) Int. Cl.
   *G06K 9/00*   (2006.01)
   *G06T 7/00*   (2006.01)

(52) U.S. Cl.
   CPC ..... *G06T 7/0004* (2013.01); *G06T 2207/10061* (2013.01); *G06T 2207/30148* (2013.01)

(58) Field of Classification Search
   None
   See application file for complete search history.

(56) References Cited

U.S. PATENT DOCUMENTS

| | | | |
|---|---|---|---|
| 7,598,490 B2 * | 10/2009 | Kurihara et al. | 250/307 |
| 7,676,077 B2 | 3/2010 | Kulkarni et al. | |
| 7,796,804 B2 | 9/2010 | Bhaskar et al. | |
| 8,422,761 B2 * | 4/2013 | Kitamura et al. | 382/145 |
| 2003/0109070 A1 | 6/2003 | Hosoya et al. | |
| 2009/0041332 A1 | 2/2009 | Bhaskar et al. | |
| 2009/0299681 A1 | 12/2009 | Chen et al. | |
| 2012/0208301 A1 | 8/2012 | Izikson et al. | |
| 2014/0105482 A1 | 4/2014 | Wu et al. | |

FOREIGN PATENT DOCUMENTS

KR   10-2006-0035159   4/2006

OTHER PUBLICATIONS

T.M Cover and J.A. Thomas, Elements of Information Theory, 2nd ed. Hoboken, New Jersey: John Wiley & Sons, Inc., 2006.
R.O. Duda and P.E. Hart, Pattern Classification and Scene Analysis, New York: John Wiley & Sons, Inc., 1973.
International Search Report and Written Opinion for PCT/US2014/033218 mailed Aug. 5, 2014.

* cited by examiner

*Primary Examiner* — Daniel Mariam
(74) *Attorney, Agent, or Firm* — Ann Marie Mewherter

(57) ABSTRACT

Methods and systems for adaptive sampling for semiconductor inspection recipe creation, defect review, and metrology are provided. The embodiments provide image processing and pattern recognition algorithms and an adaptive sampling method for extracting critical areas from SEM image patches for use in a wafer inspection system when design data for a semiconductor chip is not available. The embodiments also provide image processing and pattern recognition algorithms for efficiently discovering critical defects and significant deviations in the normal manufacturing process, using the output from a wafer inspection system and an adaptive sampling method to select wafer locations to be examined on a high resolution review or metrology tool.

67 Claims, 5 Drawing Sheets

ADAPTIVE SAMPLING FOR SEMICONDUCTOR INSPECTION RECIPE CREATION, DEFECT REVIEW, AND METROLOGY

BACKGROUND OF THE INVENTION

1. Field of the Invention

This invention generally relates to adaptive sampling for semiconductor inspection recipe creation, defect review, and metrology.

2. Description of the Related Art

The following description and examples are not admitted to be prior art by virtue of their inclusion in this section.

Semiconductor manufacturing involves a large and complex set of imaging, etching, deposition, and planarization processes in order to construct sub-micron (down to a few tens of nanometers) geometrical patterns on a silicon substrate. The usual method for detecting most random and low probability systematic defects is to compare identical locations on adjacent dies on the wafer using imaging or scattering optical tool such as the KLA-Tencor 2900 Series or KLA-Tencor 9800 Series systems. However, this task is becoming more challenging as the process windows of tolerance become tighter. Tool noise (such as sensor noise and image misalignment due to image jitter and other sources) coupled with small variations in the wafer processing introduce noise in the difference measurements when comparing nominally identical locations in adjacent dies.

The design layout of the die is often used to identify critical regions (such as areas of high geometry density) and other so-called "hot spots" where defects can manifest themselves. By separating critical from non-critical regions, a more sensitive inspection can be performed in the critical areas and a less sensitive inspection in the less critical areas. U.S. Pat. No. 7,676,077 issued on Mar. 9, 2010 to Kulkarni et al., which is incorporated by reference as if fully set forth herein, describes this approach. However, in many circumstances, the design information may not be readily available.

Accordingly, it would be advantageous to develop methods and/or systems for wafer inspection-related applications that do not have one or more of the disadvantages described above.

SUMMARY OF THE INVENTION

The following description of various embodiments is not to be construed in any way as limiting the subject matter of the appended claims.

One embodiment relates to a computer-implemented method for adaptive sampling. The method includes scanning at least a portion of a wafer with a first tool thereby generating one or more first images of at least the portion of the wafer. The first tool is capable of a higher scanning speed than a second tool, and the second tool is capable of a higher resolution than the first tool. The method also includes separating the one or more first images into segments and determining a feature vector for each of the segments. In addition, the method includes clustering the feature vectors using an unsupervised clustering algorithm thereby separating the segments into different groups based on the feature vectors and selecting one or more of the segments from a first of the different groups thereby creating a sample of segments for the first of the different groups. The method further includes acquiring one or more second images for the sample of segments using the second tool. The method also includes determining a characteristic of the sample of segments based on the one or more second images and associating the determined characteristic with all of the segments in the first of the different groups. In addition, the method includes repeating the selecting, acquiring, determining the characteristic, and associating steps for any other of the different groups. The separating, determining the feature vector, clustering, selecting, acquiring, determining the characteristic, and repeating steps are performed by one or more computer systems.

The method described above may be performed as described further herein. In addition, the method described above may include any other step(s) of any other method(s) described herein. Furthermore, the method described above may be performed by any of the systems described herein.

Another embodiment relates to a non-transitory computer-readable medium storing program instructions executable on a computer system for performing adaptive sampling. The computer-implemented method includes the steps of the method described above. The computer-readable medium may be further configure as described herein. The steps of the computer-implemented method may be performed as described herein. The steps of the computer-implemented method for which the program instructions are executable may include any other steps(s) of any other method(s) described herein.

An additional embodiment relates to a system configured to perform adaptive sampling. The system includes a first tool configured to scan at least a portion of a wafer thereby generating one of more first images of at least the portion of the wafer. The system also includes one or more computer systems configured for separating the one or more first images into segments, determining a feature vector for each of the segments, clustering the feature vectors using an unsupervised clustering algorithm thereby separating the segments into different groups based on the feature vectors, and selecting one or more of the segments from a first of the different groups thereby creating a sample of segments for the first of the different groups. The system further includes a second tool configured to acquire one of more second images for the sample of segments. The first tool is capable of a higher scanning speed then the second tool, and the second tool is capable of a higher resolution then the first tool. The one or more computer systems are further configured for determining a characteristic for the sample of segments based on the one or more second images, associating the determined characteristic with all of the segments in the first of the different groups, and repeating selecting the one or more of the segments, acquiring the one or more second images, determining the characteristic, and associating the determined characteristic for any other of the different groups. The system may be further configured as described herein.

BRIEF DESCRIPTION OF THE DRAWINGS

Other objects and advantages of the invention will become apparent upon reading the following detailed description and upon reference to the accompanying drawings in which.

Figure 1:
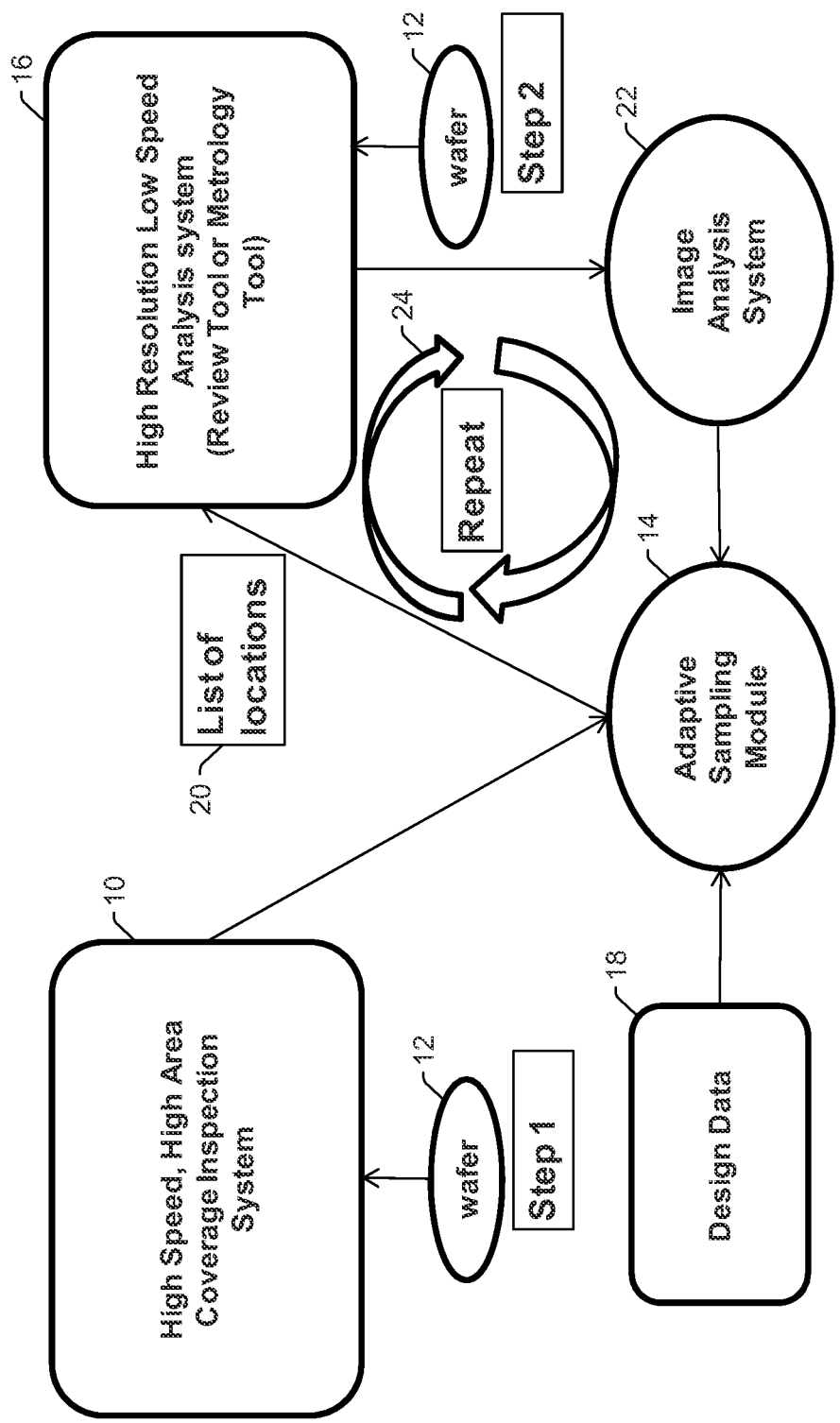
FIG. 1 is a block diagram illustrating one embodiment of a system configured for adaptive sampling.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a computer-implemented method for adaptive sampling. The method includes scanning at least a portion of a wafer with a first tool thereby generating one or more first images of at least the portion of the wafer. Scanning at least the portion of the wafer may be performed in any suitable manner. For example, the first tool may scan the wafer in a serpentine manner and generate images as the wafer is being scanned. The first tool may be further configured as described herein.

The first tool is capable of a higher scanning speed than a second tool. In other words, the second tool is not capable of as high a scanning speed as the first tool. The second tool is capable of a higher resolution than the first tool. In other words, the first tool is not capable of as high a resolution as the second tool. For example, the first tool may be a wafer inspection tool and the second tool may be a high resolution defect review tool or a high resolution metrology tool or a stored high resolution image of a die. In one such example, the first tool may be an optical or light-based inspection system while the second tool may be an electron beam-based system such as a scanning electron microscope (SEM). Although some embodiments are described further herein with respect to a SEM, it is to be understood that all of the embodiments may include or be performed using a SEM or any other suitable defect review or metrology tool or a stored high resolution image of the die.

In some instances, the first and second tools may be physically separate tools. However, in other instances, the first and second tools may be part of a cluster tool served by a wafer-handling subsystem (e.g., a wafer handling robot or other mechanical device). Various such embodiments are described further herein.

The method also includes separating the one or more first images into segments and determining a feature vector for each of the segments. In addition, the method includes clustering the feature vectors using an unsupervised clustering algorithm thereby separating the segments into different groups based on the feature vectors and selecting one or more of the segments from a first of the different groups thereby creating a sample of segments for the first of the different groups. The method further includes acquiring one or more second images for the sample of segments using the second tool. The method also includes determining a characteristic of the sample of segments based on the one or more second images and associating the determined characteristic with all of the segments in the first of the different groups. In addition, the method includes repeating the selecting, acquiring, determining the characteristic, and associating steps for any other of the different groups. The separating, determining the feature vector, clustering, selecting, acquiring, determining the characteristic, and repeating steps are performed by one or more computer systems. Each of these steps may be performed as described further herein.

The above-described general method has a number of different applications including: determining parameters(s) for wafer inspection (e.g., critical and non-critical regions on wafers, care area information, etc.); review and classification of potential defects (or events) detected on wafers; and monitoring suspicious wafer noise signatures. For example, the embodiments described herein provide image processing and pattern recognition algorithms and an adaptive sampling method for extracting critical areas from SEM image patches for use in wafer inspection when design data for a semiconductor chip is not available (although they may also be used in instances when the design data is available). In addition, the embodiments described herein provide image processing and pattern recognition algorithms for efficiently discovering critical defects and significant deviations in the normal manufacturing process using the output from a wafer inspection system and an adaptive sampling method to select wafer locations to be examined on a relatively high resolution review or metrology tool. These applications are described in further detail herein.

Adaptive Sampling for Inspection Recipe Creation or Alteration

In many circumstances in which parameter(s) are being determined for wafer inspection, the design information may not be readily available. In such cases, the embodiments described herein may be used to identity critical regions on the die from the less critical regions using a high resolution imaging tool such as a SEM and using image processing and pattern recognition techniques. In this case, one can regard the SEM image as a proxy for the design since it has the resolution to show the geometries on the wafer in sufficient detail to allow for separating critical from noncritical regions of the die.

SEM review tools today lack the throughput to image a whole die in a reasonable time. Therefore, the embodiments described herein propose first grouping portions of the optical image of a whole die obtained from the inspection tool (which typically has a 1000× throughput advantage over a SEM tool), in the clustering step described above, based on optical properties such as gray level, texture, and die-to-die noise measures, determined as the feature vectors described above, then sampling a relatively small subset of these image patches from each group, in the selecting step described above. The first tool may include one or more computer systems configured to separate the one or more first images into different segments and to determine the optical properties or the feature vectors of the different segments. For example, the one or more computer systems may be configured to analyze images(s) generated by the first tool using image processing algorithm(s).

Different geometries that are present on the wafer will cause the portions of the images corresponding to them to have different feature vectors even if the different geometries cannot be resolved by the first tool. Therefore, by separating the segments of the images into groups based on their feature vectors, the segments will essentially be separated into groups based on the geometries corresponding to the segments. In this manner, by sampling one or more segments from the different groups, a set of locations on the wafer representative of the geometries present on the wafer can be selected.

The second, higher resolution tool can then image the locations on the wafer corresponding to the selected segments and automatically analyze these locations to identify critical regions on the wafer. The embodiments also include adaptively selecting the next set of locations to be imaged and analyzed on the SEM tool based on the results of analyzing the previous set of SEM images. For example, in one embodiment, the method includes altering one or more parameters of one or more of the selecting, acquiring, determining the characteristic, and associating steps repeated for any of the other different groups based on the determined characteristic for the sample of segments. In one such example, the method may include selecting the subsequent group of segments to visit based on the result of analyzing the previous segments imaged by the second, high resolution tool. In another embodiment, the method includes altering one or more parameters of one or more of the selecting, acquiring, determining the characteristic, and associating steps repeated for any other of the different groups based on image properties of the one or more second images. For example, analysis used for selecting the subsequent set of segments may utilize the image properties of the segment locations imaged up to that point by the second tool. In an additional embodiment, the method includes altering one or more parameters of one or more of the selecting, acquiring, determining the characteristic, and associating steps repeated for any of the other different groups based on design context for the segments determined from the one or more second images. For example, the analysis used for selecting the subsequent set of segments utilizes the design context around the segment locations imaged up to that point by the second tool.

This adaptive sampling approach can significantly reduce the number of locations that need to be examined on the SEM tool. This is because, within each optically similar group of patches, the geometries are very similar. By analyzing a few of these locations in detail on the SEM, one can establish a correspondence between certain critical regions in the SEM images and their corresponding appearance in the optical patches. As one gains confidence in automatically learning (using machine learning principles) this association, one needs to only sample those groups where one has less confidence in classifying critical and non-critical regions. The adaptive selection process is a general method that can be utilized to efficiently perform this learning. Details of this algorithm are provided in the next section.

In the instance in which the one or more second images are acquired from a high resolution stored image of one or more dies on the wafer generated by the second tool, the one or more second images may be relatively small patch images extracted from the high resolution stored image. The high resolution stored image may an generated prior to performing the method. And in this instance, the second tool may be an electron beam based inspection tool that can be used to generate a high resolution stored image of one or more dies on the wafer by scanning the physical wafer with an electron beam, a computer system that simulates the high resolution stored image from design data for the wafer, or a photo-mask tool that generates a high resolution image of the physical photo-mask that approximates how the one or more die will be printed on a physical wafer. In this manner, an image generated by such "second tools" may be used in place of images that would be generated by a SEM review tool for the wafer. Instead of moving the stage and grabbing SEM high resolution images on a SEM review tool in the step of acquiring one or more second images, acquiring the second image(s) may be performed by grabbing image patches from the stored image.

The above described embodiments may be used for the one or more first images regardless of whether defects were detected in the first images(s). For example, in one embodiment, separating the one or more first images into the segments is performed without regard to locations of defects on the wafer. In one such example, a first image for an entire die on the wafer may be separated into the segments. In this manner, some of the segments may contain images or information for defects on the wafer. In another such example, the first image may include one or more swath images acquired by scanning one or more dies on the wafer. In other words, all or a portion of the images generated by the first tool for the wafer may be separated into segments and all of the segments may be used in the embodiments described herein. In contrast, some of the other embodiments described herein may use only a portion of all of the image(s) generated for the wafer by the first tool to create the segments that are used in the embodiments.

Adaptive Sampling for Defect Review and Classification

Adaptive sampling is also useful for efficient review and classification of events (potential defects) found by a lower resolution, hut higher speed wafer inspector such as the KLA-Tencor 2900 series of tools (i.e., the first tool) that can inspect a wafer and detect events of interest (potential defects or wafer manufacturing process variations).

When creating an inspection recipe, one does not know the appropriate thresholds to be applied to various regions of the die because the noise characteristics and the "normal" process variations are unknown. The usual method followed is to run a "hot" inspection recipe (i.e., an inspection in which the threshold for determining that a potential defect is present is substantially close to the noise floor of the inspection) resulting in hundreds of thousand of "defect events" being detected and then to selectively detune the recipe in different regions so as to detect a relatively large number of real and critical defects with an acceptable false alarm (nuisance) rate.

However, the "ground truth" regarding each event (i.e., whether it is a real defect or a nuisance) can only be determined by performing a SEM review of that location on a review tool. A "nuisance" or "nuisance defect" is a term commonly used in the art to refer to a potential defect that is detected on a wafer, but that is not an actual defect that is of interest to a user. In this manner, a "nuisance defect" may simply be noise on the wafer that is detected by inspection, which is not representative of any actual defect on the wafer, or an actual defect that the user does not care about.

It is not practical to manually review all of the hundreds of thousands of detected events (e.g., using a SEM review tool), because of the time involved in such a review. The current method is to manually create a classifier, group defects based on their optical properties, sample each group (using the SEM tool), manually classify these defects and iterate with a modified classifier. Several rounds of tedious and often ad hoc methods are used to obtain a good sample of defects of interest (DOI) which are then used for further refinement of the recipe.

In contrast, the embodiments described herein use adaptive sampling to automatically identify a variety of defects from a relatively large pool of events detected by the inspector. Unlike the embodiments described above, in which the first image(s) are separated into segments regardless of the defects present or not present in the first images(s), these embodiments may separate the first images(s) into segments based on the potential defects detected by the first tool. For example, in one such embodiment, the method includes detecting potential defects on the wafer based on the one or more first images, the one or more first images include swath images acquired by the scanning, and the segments include patch images acquired at locations of the detected potential defect. In one such example, as the first tool is scanning the wafer, the images generated by the scanning may be processed (e.g., using a defect detection method and/or algorithm), and portions of the images in which potential defects are detected may be grabbed and stored by the first tool such that they can be used in further steps described herein. The term "patch image" as used herein is a term that is commonly used in the art to refer to a relatively small image that can be processed by an algorithm or method as a whole. For example, a "patch image" may be a selected number of pixels surrounding a detected potential defect or an image generated by a defect review tool or metrology tool at a given location or an image retrieved from a high resolution stored image.

As in the previous case where adaptive sampling was used for identifying critical regions of the die, a similar methodology can be used here to efficiently select the most important defect types from the collection of all potential defects by using the results of SEM analysis to iteratively influence the events to be selected next for examination. For example, the method may include selecting a first set of the event locations on the wafer, imaging the locations where the events were detected by the first tool with a high resolution tool (i.e., the second tool), and selecting a subsequent set of events to be analyzed in an iterative fashion. When design data is available, this method can exploit it to improve the efficiency of finding yield-critical defects.

The adaptive sampling may also be performed based on results produced by the first tool. For example, in some embodiments, the method includes altering one or more parameters of one or more of the selecting, acquiring, determining the characteristic, and associating steps repeated for any other of the different groups and/or design context for the segments determined from the one or more first images. In other words, the analysis used for selecting the subsequent set of events may utilize the optical features extracted by the first tool at each of the event locations detected by the first tool. In addition, or alternatively, the analysis used for selecting the subsequent set of events may utilize the design context around the event locations detected by the first tool. Details of an adaptive sampling algorithm for the defect review use case are given in the next section.

Adaptive Sampling for Monitoring Suspicious Noise Signatures

The third use case for adaptive sampling is for monitoring suspicious wafer noise signatures. By noise, we mean the observed difference in gray levels between adjacent die at corresponding, substantially identical (x, y) locations (with respect to each die's origin), or the difference between a die location and the corresponding location in a reference, e.g., a defect-free die. U.S. Pat. No. 7,796,804 issued on Sep. 14, 2010 to Bhaskar et al., which is incorporated by reference as if fully set forth herein, describes various methods and systems for generating a standard reference die (SRD). Often, critical dimension (CD), variations in line widths may not be detected as defects but show up as a certain level of "noise." These CD variations also occur in some regions of the die but not others or may occur on some dies on the wafer but not others (e.g., edge dies verses interior dies on the wafer).

Because of the wafer-wide coverage provided by wafer inspection systems and their speed, one can sample selected locations in these noise signatures on a review or metrology tool. For example, in one embodiment, the feature vectors include a value for noise in the segments, and the characteristic includes a characteristic of patterned features (e.g., CD) formed on the wafer and imaged in the one or more second images. The value for noise may include any suitable value for noise such as the average noise, median noise, mean noise, etc. When design data is available, one can use it to prioritize the die locations that are to be visited based on their criticality as determined from design. For example, in one embodiment, the method includes determining a portion of a design for the wafer associated with the different groups and prioritizing the different groups for the selecting, acquiring, determining the characteristic, and associating steps based on the portion of the design associated with the different groups.

Since SEM tools are typically relatively slow, we want to use them as efficiently as possible and yet ensure that critical CD variations (for example) are not missed. The metrology measurements at a wafer site can be used to guide the selection of the next site to visit. For example, in one embodiment, acquiring the one or more second images includes acquiring the one of more second images for a first segment in the sample of segments using the second tool, determining the characteristic includes determining the characteristic for the first segment based on the one or more second images acquired for the first segment, and the method includes altering the sample of segment based on the characteristic determined for the first segment. In one such example, if a site shows a measurement substantially close to the tolerance limit for that site, one can sample other sites relatively close to it that exhibited a similar event signal on the inspector. In this way, one can confirm whether there is a systematic CD variation around that location or not. If, in a cluster of such noise locations one samples a few locations and finds that the CD measurements are well within the tolerance interval, there is no need to sample that signature any farther. In this way, the selection process can be influenced by the measurements observed up to that point.

Further Details of the Various Applications

FIG. 1 shows the architecture of one embodiment of an adaptive sampling system. High speed, large area coverage inspection system 10 (i.e., the first tool) scans wafer 12 (step 1) and generates results that are fed to adaptive sampling module 14. Wafer 12 is then transported to higher resolution, lower speed analysis system 16 (i.e., the second tool) which may be a review tool or a metrology tool. This tool generates one or more second images for the wafer (step 2). The adaptive sampling module analyzes the inspection result from system 10, uses design data 18 when it is available, and generates a list of defect locations 20 to be analyzed by the higher resolution tool. The higher resolution tool acquires data at those locations. This data, which could include image data and measurements, is sent to image analysis system 22. The image analysis system analyzes the images and classifies and/or performs measurements and feeds the results to adaptive sampling module 14. The adaptive sampling module uses this information to re-prioritize the list of locations on the wafer to be visited next by the higher resolution tool. This loop 24 is repeated until the desired information characterizing the set of events detected by the inspector has been obtained.

Figure 2:
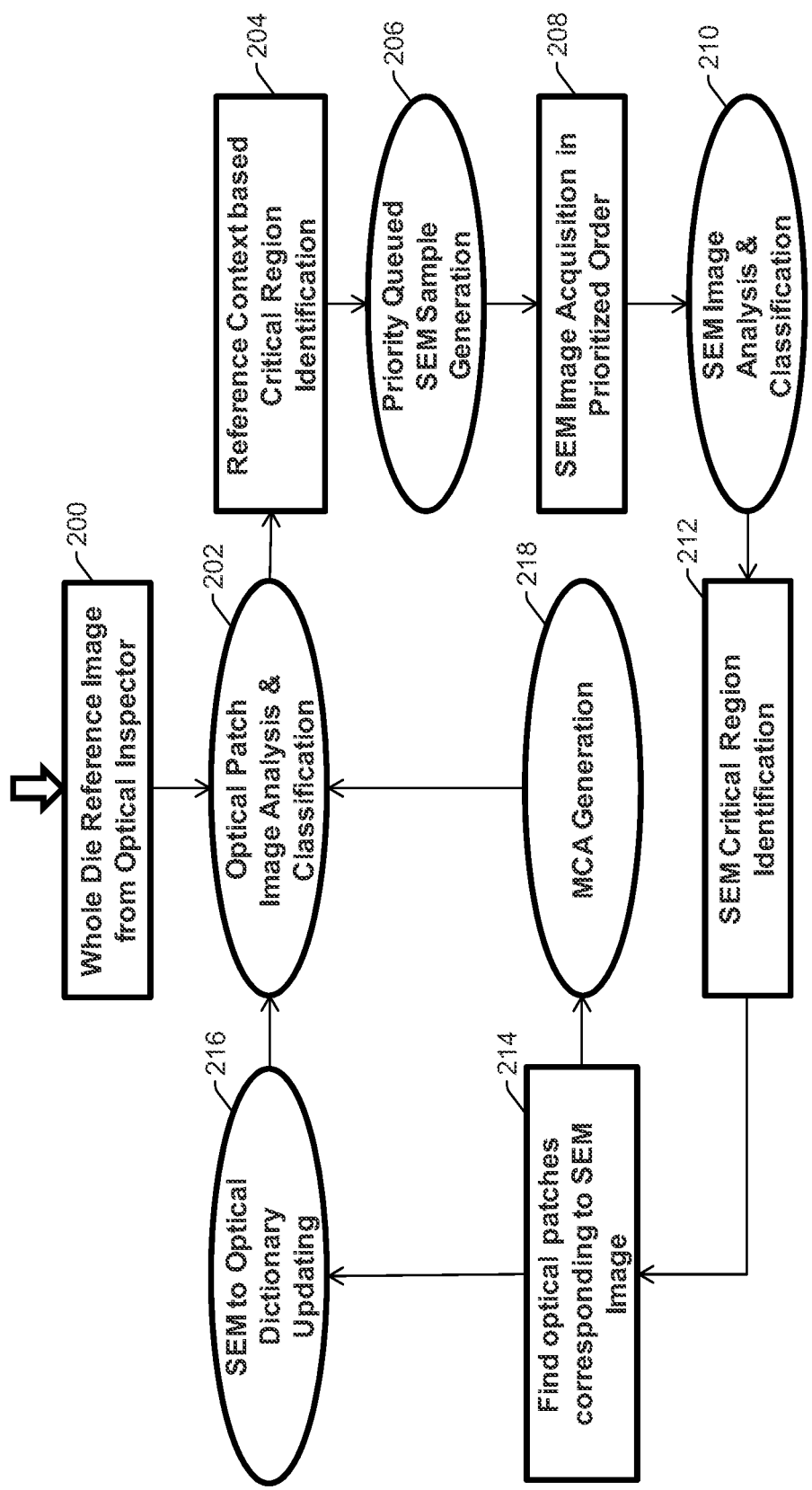
FIG. 2 is a flow chart illustrating one embodiment of a method for adaptive sampling for critical area generation.

As described farther above, the embodiments can be used for adaptive sampling of SEM images for defining critical and non-critical areas for wafer inspection when design is not available. This section describes an approach to extracting micro care areas (MCAs) from SEM image patches for use in a wafer inspection system. The goal is to develop a system that is flexible, in that different "rules" can be used to extract areas of interest. This approach can be used in situations where the design is not available. FIG. 2 describes the steps that may be performed to generate the inspection areas.

Steps for Critical Area Generation (see FIG. 2):

1. As shown in step 200 of FIG. 2, a whole die reference image may be acquired from an optical inspector. For example, a die may be scanned on the optical Inspection tool using a suitable imaging mode and pixel that allows the top layer geometry to be imaged satisfactorily.

(As shown in step 202 of FIG. 2, the method includes optical patch image analysis and classification which may include steps 2-4 described below.)

2. The die image is segmented into M×N windows, e.g. 31×31 pixels.

3. Gray level texture measures and noise measures are extracted from each N×N patch to construct a feature vector. The analysis of the image on the first tool may use properties of the image in each portion of the die and measures of differences between each such portion of the image and the corresponding portion of the image of an adjacent die on the wafer. For example, in one such embodiment, the one or more first images include difference images generated by subtracting a reference image for one area of a die on the wafer from an image generated by the first tool for the one area.

4. The different portions of the die image are then classified into different groups. For example, these feature vectors are clustered using an unsupervised clustering algorithm.

(As shown in step 204 of FIG. 2, the method may then include reference context-based critical region identification, which may include steps 5-6 described below.)

5. A representative set of locations are chosen from each group for analysis on the second tool. For example, a sample of patches from each cluster is selected automatically for SEM image acquisition and analysis. In one such example, as shown in step 206 in FIG. 2, the method includes priority queued SEM sample generation, which may be performed as described further herein with respect to the selecting step described herein. In addition, as shown in step 208 of FIG. 2, the method may include SEM image acquisition in prioritized order, which may be performed as described further herein with respect to the step of acquiring one or more second images.

6. The images obtained from the second tool or from a stored high resolution die image at the selected locations are analyzed to determine regions of the images which have critical geometry, where the criticality can be defined by asset of geometrical-based rules applied to the geometrical features found in the one or more second images. For example, each SEM patch image may be automatically analyzed, its geometry labeled and critical areas are extracted (where the definition of "critical" is defined by a set of user-supplied "rules"). In one such example, as shown in step 210 of FIG. 2, the method includes SEM image analysis and classification. In addition, as shown in step 212 of FIG. 2, the method includes SEM critical region identification.

7. The SEM patches are registered with their corresponding optical patches. For example, as shown in step 214 of FIG. 2, the method includes finding optical patches corresponding to the SEM images.

8. The critical area mask from the SEM image is mapped onto the optical patch. The SEM-to-Optical Dictionary is updated to reflect this mapping. For example, as shown in step 216 of FIG. 2, the method includes SEM to optical dictionary updating. The dictionary can include the optical sub-patch template or a feature vector describing the sub-patch or both.

9. The dictionary is applied to all the other patches that belong to the same cluster (result of step 4 above) as this optical patch. In this manner, the results of the above analysis are used to partition the die image into regions of different criticality. Wherever there is an area that matches the dictionary values, the corresponding die location is marked as a critical area.

10. An adaptive approach to SEM sampling can be employed when finding typical critical areas. For example, if the SEM analysis of samples from a particular cluster shows no critical geometry, that cluster can be skipped thus reducing the number of SEM samples acquired and the number of optical template matches that need to be conducted.

11. The result of steps 9 and 10 is a set of critical areas on the die that are to be inspected for potential yield-relevant defects. In other words, the results of the analysis are used to separate each die on the wafer into regions of different criticality. For example, as shown in step 218 of FIG. 2, the method includes MCA generation.

The regions or care areas can then be used to inspect the wafer and/or other wafers on the first tool with different sensitivities based on the criticality of the different regions. For example, in one embodiment, the determined characteristic is a criticality of the segments, and the method includes determining a criticality of areas on the wafer as the criticality of the segments corresponding to the areas and inspecting the wafer or another wafer based on the criticality of the areas.

Inspecting the wafer based on the criticality of the areas may include altering an existing recipe to update the care areas in the inspection recipe and then using the inspection recipe to inspect one or more wafers. However, inspecting the wafer based on tire criticality of the areas may include creating a new wafer inspection recipe that includes information for the criticality of the areas.

A set of user-defined rules can be used to categorize regions as critical or less critical. Given below are examples of rules one can use. The SEM images can be analyzed using any suitable morphological shape analysis algorithms to determine whether they satisfy a given rule.

1. Extract areas where lines (geometries) are closer than D nanometers.

2. Extract areas of relatively high curvature (such as corners and ends of lines).

3. Extract areas having relatively high curvature points that are closer than D nm from an adjacent line (geometrical feature).

4. Extract lines that are thinner than D nanometers

5. Extract areas where lines are thinner than D1 nm and separated by less than D2 nm spacing.

6. Any Boolean function of the above features: for example, areas where there is a relatively high curvature (e.g., ends of lines) and relatively narrow spaces.

7. Spatial relationships between features can also be used, e.g., a relatively thin space (<D nm) between two opposite (oriented) relatively high-curvature points.

As described further herein, the embodiments can be used for adaptive sampling of SEM for rapid critical defect discovery. This approach can be used daring initial inspection recipe creation by running a hot recipe on the inspector that may generate hundreds of thousands of potential defect events. This section describes a method for prioritizing defects for SEM review (see FIG. 3) based on the learning dictionary that matches optical patch properties to SEM image properties and also uses the observed noise signature to de-prioritize defects that may be nuisance events caused by the optical effects of thin films and previous layer geometry on the die.

Steps for Rapid Real Defect Discovery (See FIG. 3):

1. The whole wafer is (or selected die are) inspected to obtain a hot lot result including optical patches around the defect locations (both in the defect and reference die), which is shown in step 300 in FIG. 3.

Figure 3:
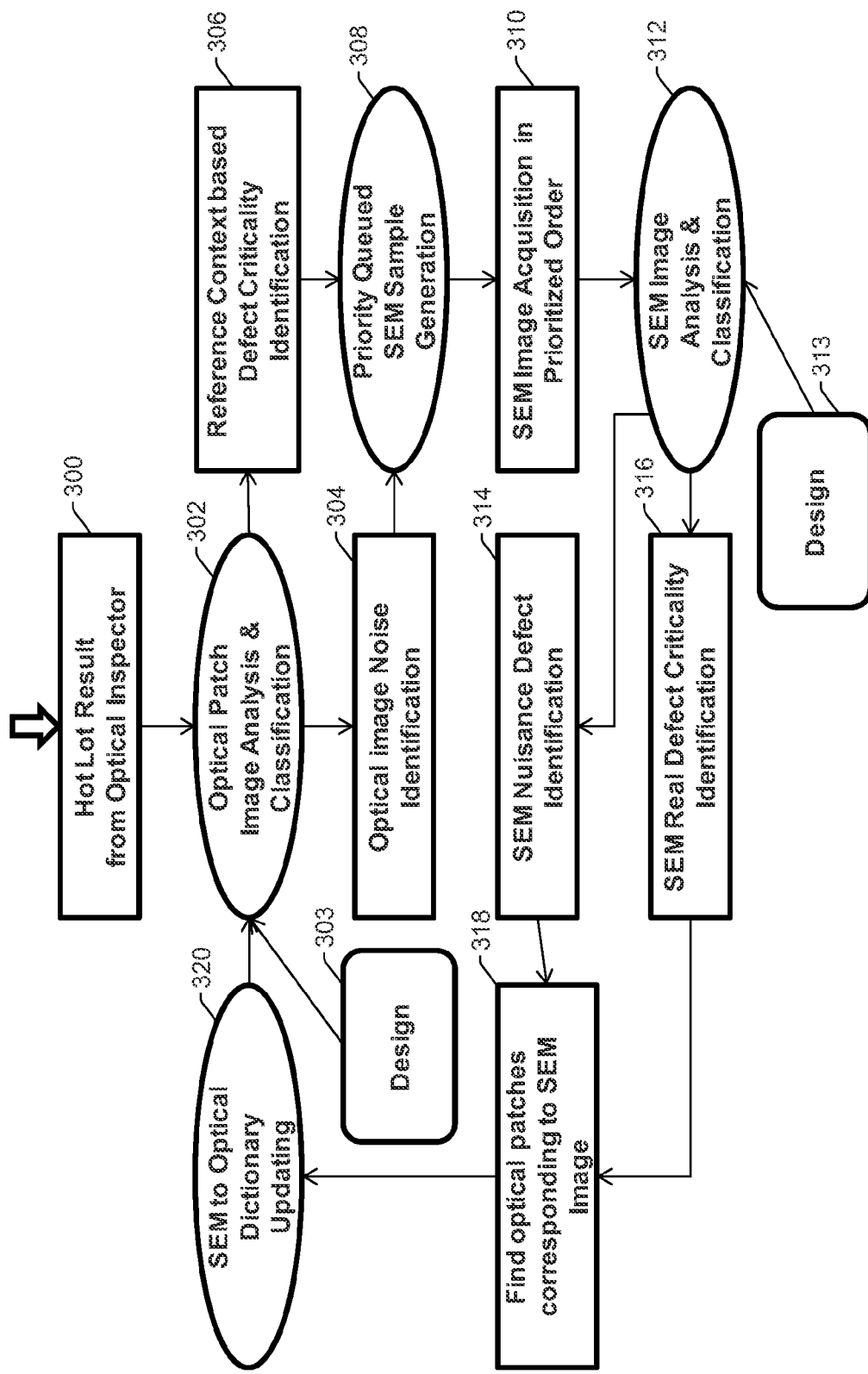
FIG. 3 is a flow chart illustrating one embodiment of a method for adaptive sampling for rapid real defect discovery.

2. As shown in FIG. 3, the method includes optical patch image analysis and classification shown in step 302 and optical image noise identification shown in step 304. For example, gray level texture measures and noise measures may be extracted from each N×N pixel patch to construct a feature vector. The optical patch image analysis may be performed using design 303 if it is available. As shown in step 306 of FIG. 3, the method includes reference context-based defect criticality identification. For example, if the design is available, the criticality of the defect location and other features derived from the defect signal and the design are also computed, such as the ratio of defect energy in dense geometry versus on sparse geometry or blank areas.

3. These feature vectors are clustered using an unsupervised clustering algorithm.

4. A sample of patches from each cluster is selected automatically for SEM image acquisition and analysis. For example, as shown in step 308 of FIG. 3, the method includes priority queued SEM sample generation. In addition, as shown in step 310 of FIG. 3, the method includes SEM image acquisition in prioritized order.

5. As shown in step 312, the method includes SEM image analysis and classification. For example, each SEM patch is automatically aligned with its corresponding optical patch, or with design 313 if it is available, and the defect location is analyzed to determine if there is an observable defect there and if so, the criticality of the surrounding geometry (e.g., density of lines and spaces, etc). As shown in step 314 of FIG. 3, the method includes SEM nuisance defect identification if there is no observable defect or if the defect is not located in critical geometry. In addition, the method includes SEM real defect (i.e., non-nuisance defect) criticality identification as shown in step 316 of FIG. 3 if a defect is observed and it is located in critical geometry.

6. The method may also include finding optical patches corresponding to the SEM image as shown in step 318 of FIG. 3 and SEM-to-optical dictionary updating as shown in step 320 of FIG. 3. In one embodiment, the determined characteristic is a determination of whether a defect is present on the wafer at locations corresponding to the sample of segments and if a defect is present, then the method includes determining one or more characteristics of the defect. For example, if no defect is found (i.e., it is a nuisance event), then the optical feature vector is recorded in the SEM-to-Optical dictionary as a nuisance for future reference. If a defect is found, it is automatically classified and recorded in the dictionary. The analysis of the events (e.g., determining one or more characteristics of a defect) can be performed automatically using an image analysis and classification algorithm or by a human classifying the events. In one embodiment, the one or more characteristics of the defect include a classification code that describes the defect. In another embodiment, determining the characteristic includes measuring geometrical patterns on the wafer. For example, the analysis of the locations visited on the second tool can be measurements of the geometrical patterns on the wafer or mask at those locations or classification codes that describe the anomalies found at those locations.

7. After the sample of defects has been automatically analyzed in the above manner, the learned dictionary is applied to the (so-far) non-sampled defects and the defects are re-prioritized based on the likelihood that they are real defects in critical areas and not nuisance defects. Details of the selection method are provided in the next section.

8. Then the next set of samples for SEM review is generated based on their priority score.

9. The above iterative process is repeated wherein each cycle improves the learned dictionary and one maximizes the probability of finding critical defects while avoiding having to review nuisance or non-critical defects.

In one embodiment, subsequent sets of events are analyzed in an iterative fashion until some specific limit is reached. For example, each of the segments may be a patch image for a potential defect detected on the wafer by the first tool, and repeating the selecting, acquiring, determining the characteristic, and associating steps for any other of the different groups is performed until a limit is readied. The limit reached is either a fixed number of event locations analyzed by the high resolution tool (i.e., a fixed number of the potential defects detected on the wafer for which the one or more second images are acquired using the second tool), some specified level of classification accuracy of the events or potential defects detected on the wafer by the first tool, or some weighted measure of the types of events (classes or categories) or actual defects found in the one or more second images.

In one embodiment, each of the segments is a patch image for a potential defect detected on the wafer by the first tool, and the acquiring, determining the characteristic, associating, and repeating steps are performed by selecting the sample of segments, for which the one or more second images are generated, that maximizes a value of or minimizes a cost of at objective function that evaluates the value or the cost of generating the one or more second images. In other words, the analysis may be based on maximizing (or minimizing) an objective function which evaluates the value (or cost) of imaging each of the locations not imaged so far on the second tool and selects locations (one or more) which will maximize the value (or minimize the cost). In one embodiment, the objective function is set prior to performing the method. In another embodiment, the objective function is modified during the method based on types of defects being detected in the one or more second images. For example, the objective function can be set at the start of the adaptive sampling procedure or modified by a user at any point in the adaptation cycle based on the types of defects being discovered by the high resolution tool. In addition, the objective function may be modified automatically during the method based on preferences of set by a user. In another embodiment, the objective function is modified based on input from a user received during the method. For example, the objective function may be modified manually by the user herself during the process, depending on what she observes in a dynamic fashion (i.e., the methods provide ways for the user to change her mind if need be). The defect scoring and sample selection method is described in the next section.

As described above, the embodiments provide a defect selection method for adaptive sampling. In this section we provide the description of a preferred embodiment. It is understood that said embodiment is exemplary and does not limit the breadth and scope of the present invention, and its description is provided only to enable any person skilled in the art to make or use the present invention.

Assume that there are m class labels indexed $0, \ldots, m-1$ with positive label dependent revelation costs (label costs in short) $C_0, \ldots, C_{m-1}$ respectively. Note that labels costs are allowed to change depending on user discretion at any stage of the learning process. Consider the universe set U of n feature points on which the learning process occurs. At a certain stage of the learning, let $P \subseteq U$ denote the set of "permanent" feature points whose class labels have been unveiled; in contrast, the temporary set $T=S\backslash P$ is the set of feature points in S for which the class labels have not been revealed. We shall call a configuration G the 2-tuple $G=(P,T)$.

For every feature point in P, its class label is known. Therefore, its objective function C(P) is a cost function that can be defined in part as the sum of the label costs of the paints in P. Formally, $$C(P) \overset{def}{=} \sum_{x \in P} c_{l(x)} \quad (1)$$

where l(x) denotes the revealed label of feature point x.

In contrast, for a feature point x∈T, its label is unknown. Let $p_i(x)$ be the probability that x's label is i∈{0, ..., m−1}($\Sigma p_i(x)=1$). As learning proceeds, these estimates get better and therefore the total uncertainty U(T) of the set t with respect to labels decreases.

If X denotes the random variable of feature point x∈T, the label uncertainty u(x) of point x can defined as the entropy (see for definition, T. M. Cover and J. A. Thomas, Elements of Information Theory, $2^{nd}$ ed., Hoboken, N.J.: John Wiley & Sons, Inc., 2006, which is incorporated by reference as if fully set forth herein) H(X) of the random variable X. Therefore, $$u(x)=H(X)=-\Sigma p_i(x)\log p_i(x) \quad (2)$$

The objective function U(T) that captures the total label uncertainty of all the feature points in T can therefore be defined as:

$$U(T) \overset{def}{=} \sum_{x \in T} u(x) \quad (3)$$

The adaptive procedure can be described as follows:
1. Given configuration $G_1=(P_t, T_t)$, select x∈$T_t$
2. $T_{t+1}=T_t\backslash\{x\}$
3. $P_{t+1}=P_t\cup\{x\}$
4. Reveal the hidden label l(x) of x, and update the probabilities $p_i(x)$.
5. Yields new configuration $G_{t+1}=(P_{t+1}, T_{t+1})$.

The method of selecting x∈$T_t$ will comprise of choosing a candidate point x from $T_t$, and making estimates $\hat{C}(P_{t+1}; x)$ of $C(P_{t+1})$ and $\hat{U}(T_{t+1}; x)$ of $U(T_{t+1})$ if x were to be selected at step t. The estimate $\hat{C}(P_{t+1}; x)$ and $\hat{U}(P_{t+1}; x)$ are the expected values of these respective objective functions. The best of these candidate points is then selected by combining $\hat{C}(P_{t+1}; x)$ and $\hat{U}(P_{t+1}; x)$. This combination can be additive, multiplicative or use some other method of combining these two quantities. The probabilities $P_i(x)$ can be updated using any of a variety of methods described in the literature (See, for example, R. O. Duda and P. E. Hart, Pattern Classification and Scene Analysis, New York: John Wiley & Sons, Inc., 1973, which is incorporated by reference as if fully set forth herein).

Each of the embodiments of the method described above may include any other step(s) of any other method(s) described herein. Furthermore, each of the embodiments of the method described above may be performed by any of the systems described herein.

All of the methods described herein may include storing results of one or more steps of the method embodiments in a non-transitory computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, after the method detects the defects, the method may include storing information about the detected defects in a storage medium.

Figure 4:
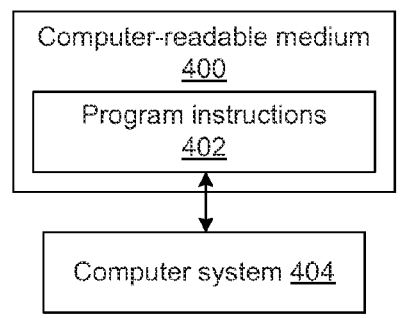
FIG. 4 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing adaptive sampling. One such embodiment is shown in FIG. 4. In particular, as shown in FIG. 4, non-transitory computer-readable medium 400 includes program instructions 402 executable on computer system 404. The computer-implemented method includes the steps of the method described above. The computer-implemented method for which the program instructions are executable may include any other step(s) described herein.

Program instructions 402 implementing methods such as those described herein may be stored on computer-readable medium 400. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), or other technologies or methodologies, as desired.

The computer system may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system may also include any suitable processor known in the art such as a parallel processor. In addition, the computer system may include a computer platform with high speed processing software, either as a standalone or a networked tool.

Figure 5:
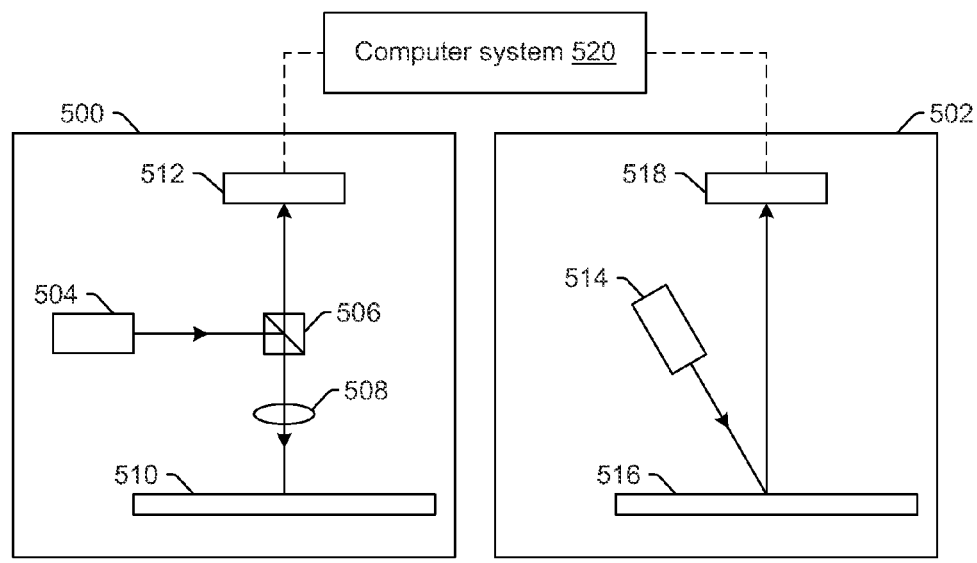
FIGS. 5-6 are schematic diagrams illustrating side views of various embodiments of a system configured for adaptive sampling.

Another embodiment relates to a system configured to perform adaptive sampling. One embodiment of such a system is shown in FIG. 5. The system includes a first tool configured to scan at least a portion of a wafer thereby generating one or more first images of at least the portion of the wafer. For example, as shown in FIG. 5, the system includes first tool 500. The first tool may be further configured as described further herein. For example, the first tool may be a relatively high speed, low resolution tool compared to second tool 502 also included in the system and described further below. In one such example, the first tool may be a light-based, or optical, wafer inspection system, including any of those commercially available from suppliers such as KLA-Tencor, Milpitas, Calif.

As shown in FIG. 5, the first tool includes light source 504. Light source 504 may include any suitable light source known in the art such as a laser. Light source 504 is configured to direct light to beam splitter 506, which is configured to reflect the light from light source 504 to refractive optical element 508. Refractive optical element 508 is configured to focus light from beam splitter 506 to wafer 510. Beam splitter 506 may include any suitable beam splitter such as a 50/50 beam splitter. Refractive optical element 508 may include any suitable refractive optical element, and although refractive optical element 508 is shown in FIG. 5 as a single refractive optical element, it may be replaced with one or more refractive optical elements and/or one or more reflective optical elements.

Light source 504, beam splitter 506, and refractive optical element 508 may, therefore, form an illumination channel for the first tool. The illumination channel may include any other suitable elements (not shown in FIG. 5) such as one or more polarizing components and one or more filters such as spectral filter. As shown in FIG. 5, the light source, beam splitter, and refractive optical element are configured such that the light is directed to the wafer at a normal or substantially normal angle of incidence. However, the light may be directed to the wafer at any other suitable angle of incidence.

The first tool may be configured to scan the light over the wafer in any suitable manner.

Light reflected from wafer 510 due to illumination may be collected by refractive optical element 508 and directed through beam splitter 506 to detector 512. Therefore, the refractive optical element, beam splitter, and detector may form a detection channel of the first tool. The detector may include any suitable imaging detector known in the art such as a charge coupled device (CCD). This detection channel may also include one or more additional components (not shown in FIG. 5) such as one or more polarizing components, one or more spatial filters, one or more spectral filters, and the like. Detector 512 is configured to generate one or more first images that are responsive to the reflected light detected by the detector.

As described above, the detector included in the first tool may be configured to detect light reflected from the wafer. Therefore, the detection channel included in the first tool may be configured as a bright field (BF) channel. However, the first tool may include one or more detection channels (not shown) that may be used to detect light scattered from the wafer due to illumination of the wafer. In addition, one or more parameters of the detection channel shown in FIG. 5 may be altered such that the detection channel detects light scattered from the wafer. In this manner, the first tool may be configured as a dark field (DF) tool and/or a BF tool.

As mentioned above, the system also includes second tool 502. The second tool is configured to acquire one or more second images for the sample of segments as described further herein. Second tool 502 may be configured as an electron beam review (EBR) tool, including any electron beam defect review tool commercially available from suppliers such as KLA-Tencor. Second tool 502 may also or alternatively be configured as a metrology tool including any metrology tool commercially available from suppliers such as KLA-Tencor. The metrology tool may be electron beam-based such as a SEM or a light-based system such as a CD scatterometry-based tool. The second tool may be further configured as described herein. For example, the second tool may be capable of a higher resolution than the first tool, but may not be capable of as high a speed as the first tool. In other words, the first tool is capable of a higher scanning speed than the second tool. In one such example, the first tool may be configured to scan light over a relatively large portion of the wafer while acquiring output (e.g., images or image data), but the second tool may be configured to scan only a substantially small portion of the wafer while acquiring output (e.g., in a move-acquire-measure type fashion).

The second fool is shown in FIG. 5 as having a generic configuration for a SEM. In particular, as shown in FIG. 5, the second tool may include electron beam source 514 that is configured to generate a beam of electrons that are directed to wafer 516 at a suitable angle of incidence by one or more focusing and/or directing elements (not shown). Electrons that are returned from the wafer due to the electron beam incident thereon may be detected by detector 518. The electrons that are returned from the wafer may be directed and focused on the detector using any suitable focusing and/or directing elements (not shown). Detector 518 may include any suitable imaging detector that can generate the one or more second images described herein in response to the electrons returned from the wafer.

The system also includes one or more computer systems coupled to the first and second tools. For example, the one or more computer systems may be coupled to detectors of the first and second tools. In one such example, as shown in FIG. 5, the one or more computer systems include computer system 520 that is coupled to detector 512 of first tool 500 and detector 518 of second tool 502 (e.g., by one or more transmission media shown by the dashed lines in FIG. 5, which may include any suitable transmission media known in the art.) The computer system may be coupled to the detectors in any suitable manner. In another example, the one or more computer systems may be coupled to individual computer systems (not shown) of the first and second tools. The computer system(s) may be coupled to the first and second tools in any other suitable manner such that image(s) and any other information for the wafer generated by the first and second tools can be sent to the computer system(s) and, optionally, such that the computer system(s) can send instructions to the first and/or second tools to perform one or more steps described herein (e.g., acquiring the one or more second images with the second tool).

The one or more computer systems (e.g., comparer system 520) are configured for separating the one or more first images into segments, determining a feature vector for each of the segments, clustering the feature vectors using an unsupervised clustering algorithm, and selecting one or more of the segments from a first of the different groups thereby creating a sample of segments for the first of the different groups. Each of these steps may be further performed as described herein. The one or more computer systems are also configured for determining a characteristic for the sample of segments based on the one or more second images acquired by the second tool, associating the determined characteristic with all of the segments in the first of the different groups, and repeating selecting the one or more of the segments, acquiring the one or more second images, determining the characteristic, and associating the determined characteristic for any other of the different groups. Each of these steps may be performed as described further herein. In addition, the computer system may be configured to perform any other step(s) described herein. The system shown in FIG. 5 may be further configured as described herein.

It is noted that FIG. 5 is provided herein to generally illustrate one configuration of first and second tools that may be included in the system embodiments described herein. Obviously, the configuration of the first and second tools described herein may be altered to optimize the performance of the system as is normally performed when designing a commercial inspection, defect review, or metrology system. In addition, the systems described herein may be implemented using an existing inspection system (e.g., by adding functionality described herein to an existing inspection system) such as the 28XX, 29XX, and Puma 9XX series of tools that are commercially available from KLA-Tencor as the first tool. For some such systems, the methods described herein may be provided as optional functionality of the system (e.g., in addition to other functionality of the system). Alternatively, the system described herein may be designed "from scratch" to provide a completely new system.

Figure 6:
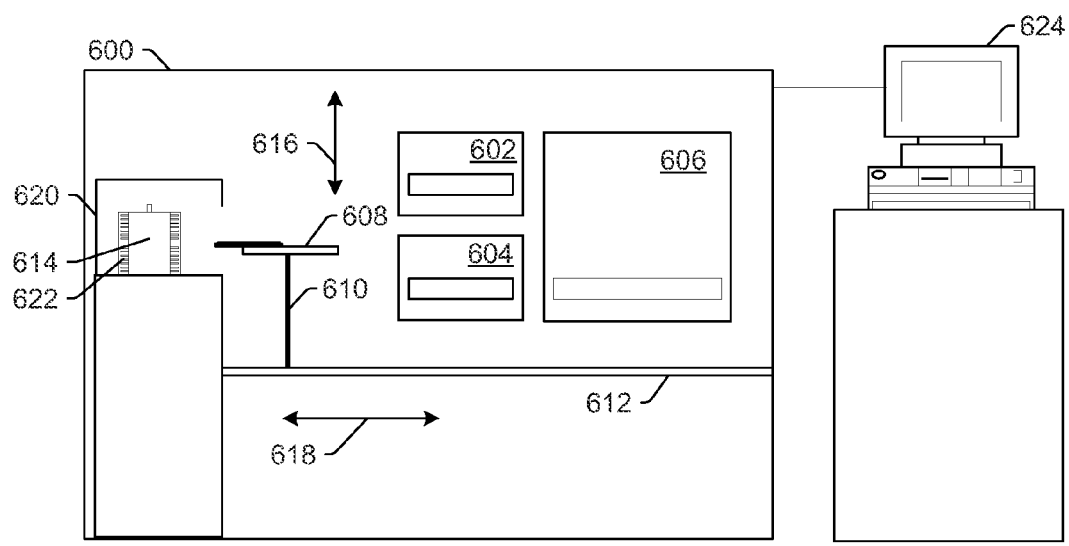

As described above, the first and second tools may be part of a cluster tool served by a wafer-handling subsystem (e.g., a wafer-handling robot). One such embodiment is shown in FIG. 6. The system shown in FIG. 6 is configured as cluster tool 600 that includes two or more wafer inspection, defect review, metrology, etc, tools (i.e., yield control-related tools) that are served by a common wafer handler. In the embodiment shown in FIG. 6, the cluster tool includes tools 602, 604, and 606. As shown in FIG. 6, some of the tools may be located above or under other tools or some of the tools may be arranged side-by-side. For example, tools 602 and 604 are arranged vertically within the cluster tool and tools 602 and 604 are arranged side-by-side with tool 606. One or more of tools 602, 604, and 606 may be configured as the first tool described further herein, and one or more tools 602, 604, 606 may be configured as the second tool described further herein. In one example, tool 602 may be configured as the first tool described herein (i.e., a high speed inspection tool), and tools 604 and 602 may be configured as different types of the second tool described herein (e.g., a defect review tool and a metrology tool). The cluster tool may include any combination of yield-related tools.

As further shown in FIG. 6, the cluster tool may include a wafer-handling subsystem that is shown in FIG. 6 as wafer support 608 attached to shaft 610 that is coupled to track 612. The wafer support may include any suitable mechanical and/or robotic device that can remove wafers from and place wafers in wafer cassette 614 or other suitable wafer container. The device may also be configured to remove wafers from and place wafers in the various tools included in the cluster tool. The shaft may also be coupled to any suitable mechanical and/or robotic device(s) such that the shaft can move the wafer support in direction 616 vertically within the cluster tool and direction 618 horizontally along the track.

In the example shown in FIG. 6, when wafer cassette 614 is placed on wafer container support 620, one of wafers 622 in the cassette may be removed by the wafer-handling subsystem and placed into the first tool (e.g., one of tools 602, 604, and 606). The one or more first images may be generated by the first tool as described herein and sent to computer system 624 included in the system. The computer system may perform any of the steps described herein including creating a sample for which second images(s) will be acquired by the second tool. The wafer-handling subsystem may remove the wafer from the first tool after the first images(s) have been generated and then place the wafer into the second tool (e.g., one other of tools 602, 604, and 606). The second tool may then generate the second images(s) for the wafer as described herein. The second images(s) may be sent to computer system 624, which may perform any other steps described herein. Each of the elements shown in FIG. 6 may be further configured as described herein. In addition, although one configuration of a cluster tool is shown in FIG. 6, it is to be understood that the systems described herein may have any suitable cluster tool configuration known in the art.

Further modifications and alternative embodiments of various aspects of the invention will be apparent to those skilled in the art in view of this description. For example, methods and systems for adaptive sampling for semiconductor inspection recipe creation, defect review, and metrology are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for adaptive sampling, comprising:
   scanning at least a portion of a wafer with a first tool thereby generating one or more first images of at least the portion of the wafer, wherein the first tool is capable of a higher scanning speed than a second tool, and wherein the second tool is capable of a higher resolution than the first tool;
   separating the one or more first images into segments;
   determining a feature vector for each of the segments;
   clustering the feature vectors using an unsupervised clustering algorithm thereby separating the segments into different groups based on the feature vectors;
   selecting one or more of the segments from a first of the different groups thereby creating a sample of segments for the first of the different groups;
   acquiring one or more second images for the sample of segments using the second tool;
   determining a characteristic for the sample of segments based on the one or more second images;
   associating the determined characteristic with all of the segments in the first of the different groups; and
   repeating the selecting, acquiring, determining the characteristic, and associating steps for any other of the different groups, wherein the separating, determining the feature vector, clustering, selecting, acquiring, determining the characteristic, and repeating steps are performed by one or more computer systems.

2. The method of claim 1, wherein the determined characteristic is a criticality of the segments, and wherein the method further comprises determining a criticality of areas on the wafer as the criticality of the segments corresponding to the areas and inspecting the wafer or another wafer based on the criticality of the areas.

3. The method of claim 1, wherein the one or more first images comprise difference images generated by subtracting a reference image for one area of a die on the wafer front an image generated by the first tool for the one area.

4. The method of claim 1, wherein the determined characteristic is a criticality of the segments, and wherein the criticality is defined by a set of geometrical-based rules applied to geometrical features found in the one or more second images.

5. The method of claim 1, wherein the determined characteristic is a criticality of the segments, and wherein the method farther comprises partitioning an image of a die on the wafer into regions having different criticalities.

6. The method of claim 1, wherein separating the one or more first images into the segments is performed without regard to locations of defects on the wafer.

7. The method of claim 1, further comprising detecting potential defects on the wafer based on the one or more first images, wherein the one or more first images comprise swath images acquired by the scanning, and wherein the segments comprise patch images acquired at locations of the detected potential defects.

8. The method of claim 1, whereto the determined characteristic is a determination of whether a defect is present on the wafer at locations corresponding to the sample of segments and if a defect is present, then the method further comprises determining one or more characteristics of the defect.

9. The method of claim 8, wherein determining the one or more characteristics of the defect is performed automatically by an image analysis and classification algorithm.

10. The method of claim 8, wherein the one or more characteristics of the defect comprise a classification code that describes the defect.

11. The method of claim 1, wherein determining the characteristic comprises measuring geometrical patterns on the wafer.

12. The method of claim 1, further comprising altering one or more parameters of one or more of the selecting, acquiring, determining the characteristic, and associating steps repeated for the any other different groups based on the feature vectors for the segments in the different groups.

13. The method of claim 1, further comprising altering one or more parameters of one or more of the selecting, acquiring, determining the characteristic, and associating steps repeated for the any other different groups based on design context for the segments determined from the one or more first images.

14. The method of claim 1, further comprising altering one or more parameters of one or more of the selecting, acquiring, determining the characteristic, and associating steps repeated for the any other different groups based on the determined characteristic for the sample of segments.

15. The method of claim 1, further comprising altering one or more parameters of one or more of the selecting, acquiring, determining the characteristic, and associating steps repeated for the any other different groups based on image properties of the one or more second images.

16. The method of claim 1, further comprising altering one or more parameters of one or more of the selecting, acquiring, determining the characteristic, and associating steps repeated for the any other different groups based on design context for the segments determined from the one or more second images.

17. The method of claim 1, wherein each of the segments is a patch image for a potential defect detected on the wafer by the first tool, and wherein repeating the selecting, acquiring, determining the characteristic, and associating steps for any other of the different groups is performed until a limit is reached.

18. The method of claim 17, wherein the limit is a fixed number of the potential defects detected on the wafer for which the one or more second images are acquired using the second tool.

19. The method of claim 17, wherein the limit is a classification accuracy of the potential defects detected on the wafer by the first tool.

20. The method of claim 1, wherein the limit is a weighted measure of types of actual defects found in the one or more second images.

21. The method of claim 1, wherein each of the segments is a patch image for a potential defect detected on the wafer by the first tool, and wherein the acquiring, determining the characteristic, associating, and repeating steps are performed by selecting the sample of segments, for which the one or more second images are generated, that maximizes a value of or minimizes a cost of an objective function that evaluates the value or the cost of generating the one or more second images.

22. The method of claim 21, wherein the objective function is set prior to performing the method.

23. The method of claim 21, wherein the objective function is modified during the method based on types of defects being detected at the one or more second images.

24. The method of claim 23, wherein the objective function is a cost function defined in part as the sum of label costs of feature points in a set of the feature points.

25. The method of claim 23, wherein the objective function is modified automatically during the method based on preferences set by a user.

26. The method of claim 23, wherein the objective function is modified based on input from a user received during the method.

27. The method of claim 1, wherein the feature vectors comprise a value for noise in the segments, and wherein the characteristic comprises a characteristic of patterned features formed on the wafer and imaged in the one or more second images.

28. The method of claim 27, further comprising determining a portion of a design for the wafer associated with the different groups and prioritizing the different groups for the selecting, acquiring, determining the characteristic, and associating steps based on the portion of the design associated with the different groups.

29. The method of claim 27, wherein said acquiring comprises acquiring the one or more second images for a first segment in the sample of segments using the second tool, wherein determining the characteristic comprises determining the characteristic for the first segment based on the one or more second images acquired for the first segment, and wherein the method further comprises altering the sample of segments based on the characteristic determined for the first segment.

30. The method of claim 1, wherein the second tool is a defect review tool.

31. The method of claim 1, wherein the second tool is a metrology tool.

32. The method of claim 1, wherein the one or more second images are acquired from a high resolution stored image of one or more dies on the wafer generated by the second tool.

33. The method of claim 1, wherein the first and second tools are part of a cluster tool served by a wafer-handling subsystem.

34. A non-transitory computer-readable medium, storing program instructions executable on a computer system for performing adaptive sampling, wherein the computer-implemented method comprises;
   acquiring one or more first images of at least a portion of a wafer generated by scanning at least the portion of the wafer with a first tool, wherein the first tool is capable of a higher scanning speed than a second tool, and wherein the second tool is capable of a higher resolution than the first tool;
   separating the one or more first images into segments;
   determining a feature vector for each of the segments;
   clustering the feature vectors using an unsupervised clustering algorithm thereby separating the segments into different groups based on the feature vectors;
   selecting one or more of the segments from a first of the different groups thereby creating a sample of segments for the first of the different groups;
   acquiring one or more second images for the sample of segments using the second tool;
   determining a characteristic for the sample of segments based on the one or more second images;
   associating the determined characteristic with all of the segments in the first of the different groups; and
   repeating the selecting, acquiring the one or more second images, determining the characteristic, and associating steps for any other of the different groups.

35. A system configured to perform adaptive sampling, comprising:
   one or more processors that function as: a first tool configured to scan at least a portion of a wafer thereby generating one or more first images of at least the portion of the wafer;
   one or more computer systems configured for;
      separating the one or more first images into segments;
      determining a feature vector for each of the segments;
      clustering the feature vectors using an unsupervised clustering algorithm thereby separating the segments into different groups based on the feature vectors; and selecting one or more of the segments from a first of the different groups thereby creating a sample of segments for the first of the different groups; and one or more processors that function as: a second tool configured to acquire one or more second images for the sample of segments, wherein the first tool is configured to have a higher scanning speed than the second tool, wherein the second tool is configured to have a higher resolution than the first tool, and wherein the one or more computer systems are further configured for:

determining a characteristic for the sample of segments based on the one or more second images;

associating the determined characteristic with all of the segments in the first of the different groups; and repeating selecting the one or more of the segments, acquiring the one or more second images, determining the characteristic, and associating the determined characteristic for any other of the different groups.

36. The system of claim 35, wherein the determined characteristic is a criticality of the segments, and wherein the one or more computer systems are further configured for determining a criticality of areas on the wafer as the criticality of the segments corresponding to the areas and inspecting the wafer or another wafer based on the criticality of the areas.

37. The system of claim 35, wherein the one or more first images comprise difference images generated by subtracting a reference image for one area of a die on the wafer from an image generated by the first tool for the one area.

38. The system of claim 35, wherein the determined characteristic is a criticality of the segments, and wherein the criticality is defined by a set of geometrical-based rules applied to geometrical features found in the one or more second images.

39. The system of claim 35, wherein the determined characteristic is a criticality of the segments, and wherein the one or more computer systems are further configured for partitioning an image of a die on the wafer into regions having different criticalities.

40. The system of claim 35, wherein separating the one or more first images into the segments is performed without regard to locations of defects on the wafer.

41. The system of claim 35, wherein the one or more computer systems are further configured for detecting potential defects on the wafer based on the one or more first images, wherein the one or more first images comprise swath images acquired by the scanning, and wherein the segments comprise patch images acquired at locations of the detected potential defects.

42. The system of claim 35, wherein the determined characteristic is a determination of whether a defect is present on the wafer at locations corresponding to the sample of segments and if a defect is present, then the one or more computer systems are further configured for determining one or more characteristics of the defect.

43. The system of claim 42, wherein determining the one or more characteristics of the defect is performed automatically by an image analysis and classification algorithm.

44. The system of claim 42, wherein the one or more characteristics of the defect comprise a classification code that describes the defect.

45. The system of claim 35, wherein determining the characteristic comprises measuring geometrical patterns on the wafer.

46. The system of claim 35, wherein the one or more computer systems are further configured for altering one or more parameters of one or more of the selecting the one or more of the segments, acquiring the one or more second images, determining the characteristic, and associating the determined characteristic repeated for the any other different groups based on the feature vectors for the segments in the different groups.

47. The system of claim 35, wherein the one or more computer systems are further configured for altering one or more parameters of one or more of the selecting the one or more of the segments, acquiring the one or more second images, determining the characteristic, and associating the determined characteristic repeated for the any other different groups based on design context for the segments determined from the one or more first images.

48. The system of claim 35, wherein the one or more computer systems are further configured for altering one or more parameters of one or more of the selecting the one or more of the segments, acquiring the one or more second images, determining the characteristic, and associating the determined characteristic repeated for the any other different groups based on the determined characteristic for the sample of segments.

49. The system of claim 35, wherein the one or more computer systems are further configured for altering one or more parameters of one or more of the selecting the one or more of the segments, acquiring the one or more second images, determining the characteristic, and associating the determined characteristic repeated for the any other different groups based on image properties of the one or more second images.

50. The system of claim 35, wherein the one or more computer systems are further configured for altering one or more parameters of one or more of the selecting the one or more of the segments, acquiring the one or more second images, determining the characteristic, and associating the determined characteristic repeated for the any other different groups based on design context for the segments determined from the one or more second images.

51. The system of claim 35, wherein each of the segments is a patch image for a potential defect detected on the wafer by the first tool, and wherein the one or more computer systems are configured to perform the repeating until a limit is reached.

52. The system of claim 51, wherein the limit is a fixed number of the potential defects detected on the wafer for which the one or more second images are acquired using the second tool.

53. The system of claim 51, wherein the limit is a classification accuracy of the potential defects detected on the wafer by the first tool.

54. The system of claim 51, wherein the limit is a weighted measure of types of actual defects found in the one or more second images.

55. The system of claim 35, wherein each of the segments is a patch image for a potential defect detected on the wafer by the first tool, and wherein acquiring the one or more second images, determining the characteristic, associating the determining characteristic, and the repeating are performed by selecting the sample of segments, for which the one or more second images are generated, that maximizes a value of or minimizes a cost of an objective function that evaluates the value or the cost of generating the one or more second images.

56. The system of claim 55, wherein the objective function is set prior to said generating the one or more first images.

57. The system of claim 55, wherein the objective function is modified based on types of defects being detected in the one or more second images.

58. The system of claim 57, wherein the objective function is a cost function defined in part as the sum of label costs of feature points in a set of the feature points.

59. The system of claim 57, wherein the objective function is modified automatically based on preferences set by a user.

60. The system of claim 57, wherein the objective function is modified based on input from a user received by the system.

61. The system of claim 35, wherein the feature vectors comprise a value for noise in the segments, and wherein the characteristic comprises a characteristic of patterned features formed on the wafer and imaged in the one or more second images.

62. The system of claim 61, wherein the one or more computer systems are further configured for determining a portion of a design for the wafer associated with the different groups and prioritizing the different groups for the selecting one or more of the segments, acquiring the one or more second images, determining the characteristic, and associating the determined characteristic based on the portion of the design associated with the different groups.

63. The system of claim 61, wherein acquiring the one or more second images comprises acquiring the one or more second images for a first segment in the sample of segments using the second tool, wherein determining the characteristic comprises determining the characteristic for the first segment based on the one or more second images acquired for the first segment, and wherein the one or more computer systems are further configured for altering the sample of segments based on the characteristic determined for the first segment.

64. The system of claim 35, wherein the second tool is a defect review tool.

65. The system of claim 35, wherein the second tool is a metrology tool.

66. The system of claim 35, wherein the one or more second images are acquired from a high resolution stored image of one or more dies on the wafer generated by the second tool.

67. The system of claim 35, wherein the first and second tools are part of a cluster tool served by a wafer-handling subsystem.

* * * * *